Sept. 2, 1969   E. HAGOPIAN   3,464,797

INSTRUMENT FOR DETERMINING OZONE

Filed Oct. 26, 1966

United States Patent Office 3,464,797
Patented Sept. 2, 1969

3,464,797
INSTRUMENT FOR DETERMINING OZONE
Erivan Hagopian, Newton, Mass., assignor to Cabot Corporation, Boston, Mass., a corporation of Delaware
Filed Oct. 26, 1966, Ser. No. 589,616
Int. Cl. G01n 31/10
U.S. Cl. 23—232    5 Claims

ABSTRACT OF THE DISCLOSURE

A process for measuring the quantity of ozone in a gas stream which entails catalytically decomposing ozone to oxygen, dissipating heat of reaction and measuring a difference in thermal conductivities, and an apparatus suitable for carrying out said process.

---

This invention relates to apparatus for accurately measuring quantities of ozone in multicomponent gas streams.

Ozone is a triatomic compound of oxygen. It is a very powerful oxidizing agent; for example, metals like mercury and silver which do not tarnish in the presence of oxygen tarnish rapidly in air containing ozone. This strong oxidizing ability is utilized in various chemical applications including the aftertreatment of carbon black and the bleaching of fabrics containing various oxidizable organic dyes. Ozone has a pungent odor and can be detected qualitatively when present only to the extent of about one part in 50,000,000 parts. It is a highly toxic compound and is dangerous to inhale for any lengthy period of time even when at very low concentrations.

Ozone is most conveniently manufactured in low concentrations by subjecting an air stream to electrostatic discharge. These concentrations are typically from 1 to 3% in oxygen. Measurement of such low concentrations of ozone is quantitatively difficult. The difficulty of accurate measurement increases with the complexity of the gas stream.

One known method for analysis of ozone is using a so-called photometric analyzer wherein the opacity of ozone to ultra violet light is utilized as a measure of ozone content of a gas. Problems associated with the use of such photometric apparatus include the necessity of frequent recalibration because of drift in the efficiency of the ultra-violet light source and zero drift caused by heat emanating from the light source.

Another apparatus used for measuring ozone quantitatively is that apparatus utilizing means for thermally decomposing ozone to oxygen in a gas stream to form an ozone-free gas and thereupon comparing the properties of the gas being analyzed with the ozone-free gas. The difference in properties between the gases is then to be attributed to the thermal decomposition of all ozone in the latter gas. Problems associated with this apparatus using a thermal decomposition means include fugitive heat from a required heat source interfering with gas-comparison means which are often highly temperature sensitive. One example of such a temperature sensitive means is the thermal conductivity cell, often preferred for measuring the difference between the ozone-bearing and ozone-freed gas. Another problem inherent in use of the thermal-decomposition type of apparatus is the fact that it cannot be used to analyze streams which contain quantities of heat-sensitive or easily oxidizable gases which will be decomposed along with the ozone.

Thus it is a principal object of the instant invention to provide a process which will allow the convenient, rapid, and accurate analysis of gas streams comprising ozone.

It is another object of the invention to provide a process for carrying out the detection of ozone in gas streams comprising gases which dissociate in environments at or below the thermal dissociation temperature of ozone.

Other objects of the invention will be in part obvious and in part set forth in the specification hereinbelow.

Applicants have achieved their primary object by the discovery that low-temperature decompositions of ozone to oxygen can be carried out continuously for long periods of time by passing the ozone-bearing gas through a bed of activated charcoal or like material. Surprisingly, it has been discovered that this quantitative decomposition of ozone may be carried out over a wide temperature range and evolves so little heat that a thermal equilibrium can be reached very rapidly and maintained by the use of very simple heat-exchange means. Thus, the apparatus may be calibrated easily and less frequently than other apparatus. Moreover, little or no thermal insulation is required in the apparatus of the invention for achieving these advantages. The apparatus is, of course normally operated at about 25° C., i.e. room temperature. However, it also operates well at higher temperatures and the decomposition may be carried out successfully as low as −76° C. or even lower.

In the specifictaion and in the accompanying drawings are shown and described an illustrative embodiment of the invention; modifications thereof are indicated, but it is to be understood that these are not intended to be exhaustive nor limiting of the invention, but on the contrary are given for the purposes of illustration in order that others skilled in the art may fully understand the invention and the manner of applying it in practical applications. The various objects, aspects and advantages of the present invention will be more fully understood from a consideration of the specification in conjunction with the accompanying drawings.

Figure 1:
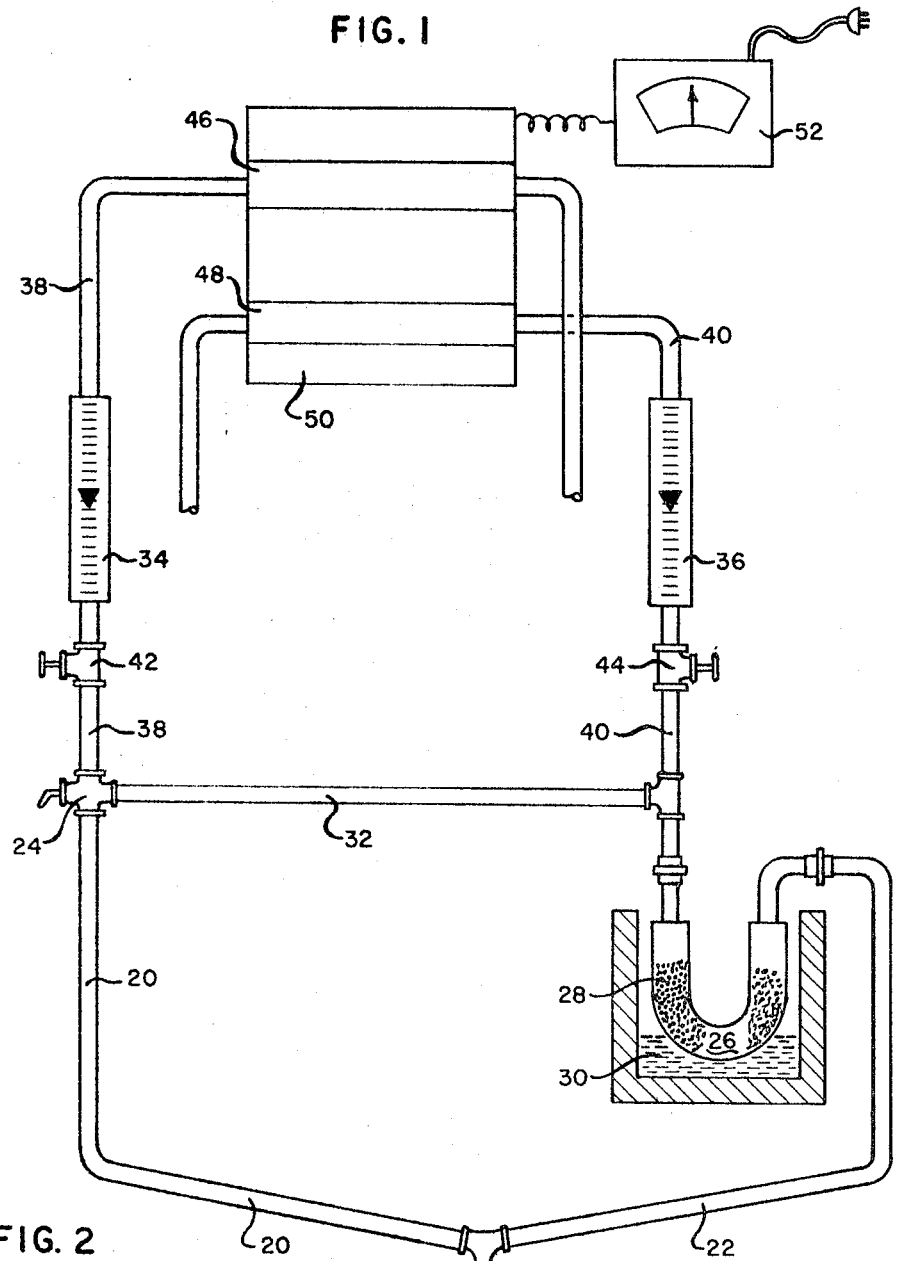
FIGURE 1 is partially a block diagram and partially a schematic diagram shownving an analytical apparatus constructed according to the invention.

Referring to FIGURE 1, it is seen that sample inlet pipe 12 comprises a sample-conditioning unit 14 containing a gas filter 16 and a cold trap 18. Pipe 12 connects into conduits 20 and 22. Conduit 20 leads to a 3-way valve 24. Conduit 22 leads to an ozone decomposition chamber 26 comprising a bed of activated charcoal 28 set in an ice-water bath 30. A conduit 32 connects the outlet side of charcoal bed 28 to a 3-way valve 24.

Flowmeters 34 and 36 are mounted in conduit 38 and 40 respectively. Valve means 42 and 44 provide means for careful control of gas volume through the flowmeters.

Conduits 38 and 40 lead to thermal conductivity-sensing cells 46 and 48, respectively, of thermal conductivity detector block 50. A recording apparatus 52 is operably connected to said block 50 and provides means to measure and record the output signal from cells 46 and 48.

In operation, an ozone-bearing gas to be analyzed is admitted into pipe 12 and passed through filter 16 to remove lint, soot or dust from the sample and thence through cold trap 18 to remove moisture and other easily-condensible materials from the inlet sample. The ozone-bearing gas is then split into two streams one flowing through conduit 20, 3-way valve 24, and flow meter 34 to thermal conductivity cell 46; the other through conduit 22, charcoal bed 28 and flowmeter 36 to thermal conductivity cell 48. These cells 46 and 48 are thermostated by controlling the temperature of block 49 in which they are held.

In charcoal bed 28, the ozone undergoes the following decomposition:

$$2O_3 \rightarrow 3O_2 + 68{,}000 \text{ calories}$$

Ice-water bath 30 is a means for removing the 68,000 calories which, if not removed, could build up sufficient heat to ignite the charcoal.

Thus a control sample of the inlet gas is continually fed into thermal conductivity cell 46 while, simultaneously, a sample is fed into conductivity cell 48 which latter sample differs from the control sample in that its ozone content has been converted into oxygen. This difference in composition will manifest itself as a difference in physical properties of the two gas samples including a difference in thermal conductivity which, in the instant case, can be converted to a single signal continually recorded on recorder 52.

Calibration of the apparatus is conveniently carried out by supplying a known mixture of ozone and oxygen to activated charcoal bed 28 and thence to both thermal conductivity cells 48 and 46. While supplying both cells with this gas, the zero knob on the thermal conductivity sensing apparatus is adjusted to the zero-point, i.e. the point that both thermal conductivity cells are to be interpreted as reporing a no-ozone content. Next, part of the known gas mixture is diverted through conduit 20 and passes through cell 46. If the thermal conductivity apparatus comprises a span feature, the span of the recorder can be adjusted to any desired level. For example, if the calibration gas containing a known quantity of ozone, say 3%, were to be the maximum concentration which one would expect to have to measure for a given application, then the span (or output) of the apparatus can be adjusted so that the full range of response to the readout scale on recorder 52 will range from 0 to 3% ozone. It is usually most desirable to repeat this calibration procedure two or more times in order to assure an accurate span.

A read-out means found to be suitable for use in practicing the invention is that sold under the trade designation Servoriter II by Texas Instruments Incorporated. However, any similar type millivolt recorder could be used conveniently.

A thermal conductivity-measuring apparatus found to be suitable for practice of the invention is that sold under the trade designation Model 210LS by the Gow-Mac Instrument Company and comprising 30–S thermoconductivity detecting cells.

In the above illustration of the invention, an ice-water bath is described as a means for removing heat generated in the catalyst bed on the decomposition of ozone to oxygen. Other means may be utilized, or in some situations when the ozone stream is rather cool and contains very little ozone, no external cooling may be necessary except the gas-stream itself.

Figure 2:
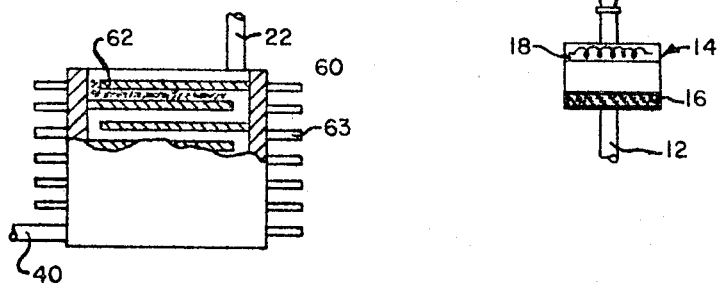
FIGURE 2 is a section of an alternative means, a container for the catalyst, for avoiding heat build-up in the apparatus of the invention.

Among other useful cooling means is an aluminum finned holder for the charcoal as shown in FIGURE 2. The charcoal 28 is held in a vessel 60 constructed of an oxidant-resisting material of high heat conductivity; aluminum is a particularly useful material. Baffles 62 and fins 63 provide means to conduct heat out from the ozone decomposition zone to dissipate it evenly.

It is understood, of course, that operability of the instant apparatus depends upon limiting the composition of gases accompanying ozone into the decomposition zone to those which can reach an absorption-desorption equilibrium with the porous decomposition catalyst without substantially affecting the catalytic properties thereof. Activated charcoals, for example those prepared from cocoanut wastes, are of high utility because of their availability, low cost and ability to reach equilibrium with such common industrial exhaust gases as the oxides of carbon, nitrogen, oxygen and the like.

However, when special circumstances make use of charcoal undesirable, a number of other ozone-decomposing catalysts may be selected as appropriate to the particular case. For example manganese dioxide, lead dioxide, soda lime and the like are known to effect the catalytic decomposition of ozone.

What is claimed is:

1. A process for measuring the quantity of ozone in a gas stream comprising
   (a) dividing said stream into a first and second portion,
   (b) causing said first portion to be intimately contacted with a particulate catalyst effective to promote the decomposition of ozone to oxygen, thereby converting said first portion into an ozone-free gas stream,
   (c) removing heat generated during said catalystic decomposition of ozone to oxygen,
   (d) simultaneously passing said ozone-free stream and said second portion of said gas stream to be tested through a means for measuring a difference in thermal conductivity properties between said ozone-free stream and said second portion,
   (e) and measuring said difference relative to the quantity of ozone present in said gas stream.

2. In apparatus for measuring ozone in a gas stream, means for dividing at least a portion of said gas stream into at least two substreams,
   test means for comparing ozone content of said substreams,
   conduit means between said dividing means and said testing means for transport of said substreams therebetween
   one said conduit means suitable for the passage of said first substream in a condition in which triatomic oxygen gas contained therein remains in said triatomic form during passage therethrough
   another said conduit means suitable for passage of a second said substream comprising a porous solid catalytic material suitable for causing decomposition of said triatomic oxygen to diatomic oxygen
   and means for removing heat from said porous material.

3. Apparatus as defined in claim 2 wherein said test means is a dual-cell thermoconductivity-measuring instrument.

4. Apparatus as defined in claim 2 wherein said porous solid catalytic material is activated charcoal, manganese dioxide, lead dioxide or soda lime.

5. Apparatus as defined in claim 2 wherein said porous catalytic bed is held in a container constructed of a high thermal conductivity.

References Cited

UNITED STATES PATENTS 3,153,577    10/1964    McCully et al.

OTHER REFERENCES

E. K. Rideal: Ozone, London, Constable & Co. Ltd., 1920, pp. 58 and 135 relied on.

MORRIS O. WOLK, Primary Examiner

R. M. REESE, Assistant Examiner

U.S. Cl. X.R.

23—254; 73—23